INVENTOR.
Andries C. de Wilde
BY Paul J. Leising
ATTORNEY

April 12, 1966  A. C. DE WILDE  3,245,138
APPARATUS FOR PRESS-FITTING MEMBERS
Filed Sept. 20, 1962  2 Sheets-Sheet 2

INVENTOR.
Andries C. de Wilde
BY
Paul J. Reising
ATTORNEY

United States Patent Office 3,245,138
Patented Apr. 12, 1966

3,245,138
APPARATUS FOR PRESS-FITTING MEMBERS
Andries C. de Wilde, Warren, Mich., assignor to General Motors Corporation, Detroit, Mich., a corporation of Delaware
Filed Sept. 20, 1962, Ser. No. 225,036
6 Claims. (Cl. 29—252)

This invention relates to an apparatus that utilizes vibratory energy for facilitating the press-fitting of two members.

Where two members are to be press-fitted, the usual practice is to use a hydraulic press or other form of force-applier which exerts a unidirection force against one of the members in the direction of insertion. The chief drawback of this practice is that frequently as one of the members enters the other, it may advance a predetermined distance and then stop, followed by a further advance. This "slip-stick" movement can be continuous during the entire travel of the inserting member and is believed to be responsible, at least in part, for inner wall galling. More importantly, it has been found that this movement makes it extremely difficult to properly "bottom" the moving member, for example, on a shoulder formed within the receiving member.

The present invention contemplates an apparatus that alleviates the attendant problems associated with a press-fitting operation and permits the use of a force applier having a capacity much less than ordinarily utilized for the same operation. Broadly stated, this is accomplished by directing vibratory energy to the movable member so as to facilitate the mating thereof with an accommodating member. The apparatus made in accordance with the invention includes a flexural member mounting vibration generating means which is adapted to be coupled in vibration transmitting relationship with the members to be press fitted. For optimum results, the vibration generating means is operated at a frequency not less than 100 cycles per second and at the resonant frequency of the flexural member.

A more complete understanding of the invention can be derived from the following description taken in conjunction with the drawings in which, FIGURE 1 is an elevation view showing the present invention utilized with a press that is adapted to insert cylinder liners into the piston bores of an engine block, FIGURE 2 is a view of the vibrating apparatus taken on line 2—2 of FIGURE 1, FIGURE 3 is a view similar to FIGURE 2 showing the force being applied by the vibrators in a certain direction.

Figure 1:
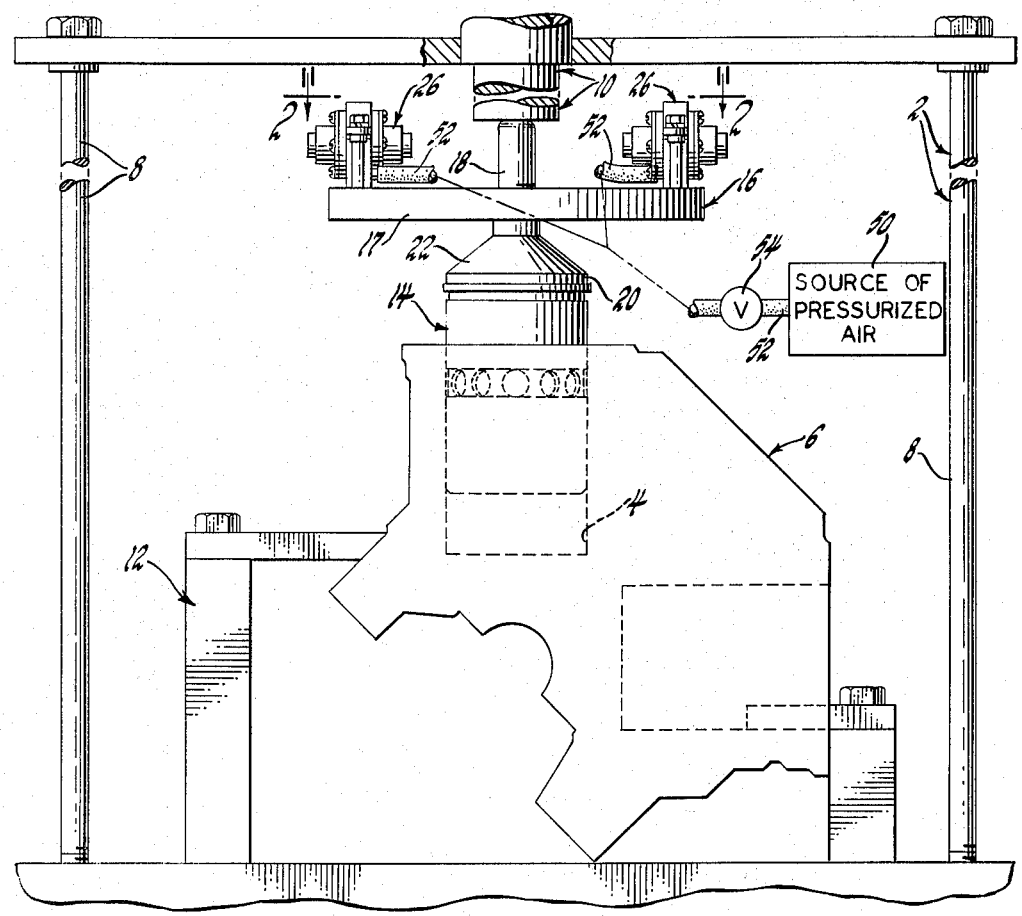

Referring now to FIGURE 1, for illustrative purposes the present invention is shown incorporated with an air-operated press 2 used for inserting liners into the piston bores 4 of the engine 6. More specifically, the press comprises an upstanding support structure 8 having an air-operated ram 10 that is carried by a cross member of the support structure. As is conventional, the ram is adapted to apply a vertical force in a downward direction upon receiving compressed air from a suitable source, not shown. Below the ram, the engine block 6 is rigidly held in a fixture 12 that serves to properly position the bores in vertical alignment with the ram. The engine block is made of cast aluminum, and in order to prevent the inner walls of the bore from wearing, a tubular liner such as that shown by the numeral 14 is inserted into each bore. This liner is ordinarily formed from a metal that is heat and wear resistant so as to enable it to withstand the engine-operating temperatures and frictional contact caused by the rings of the reciprocating piston.

Figure 4:
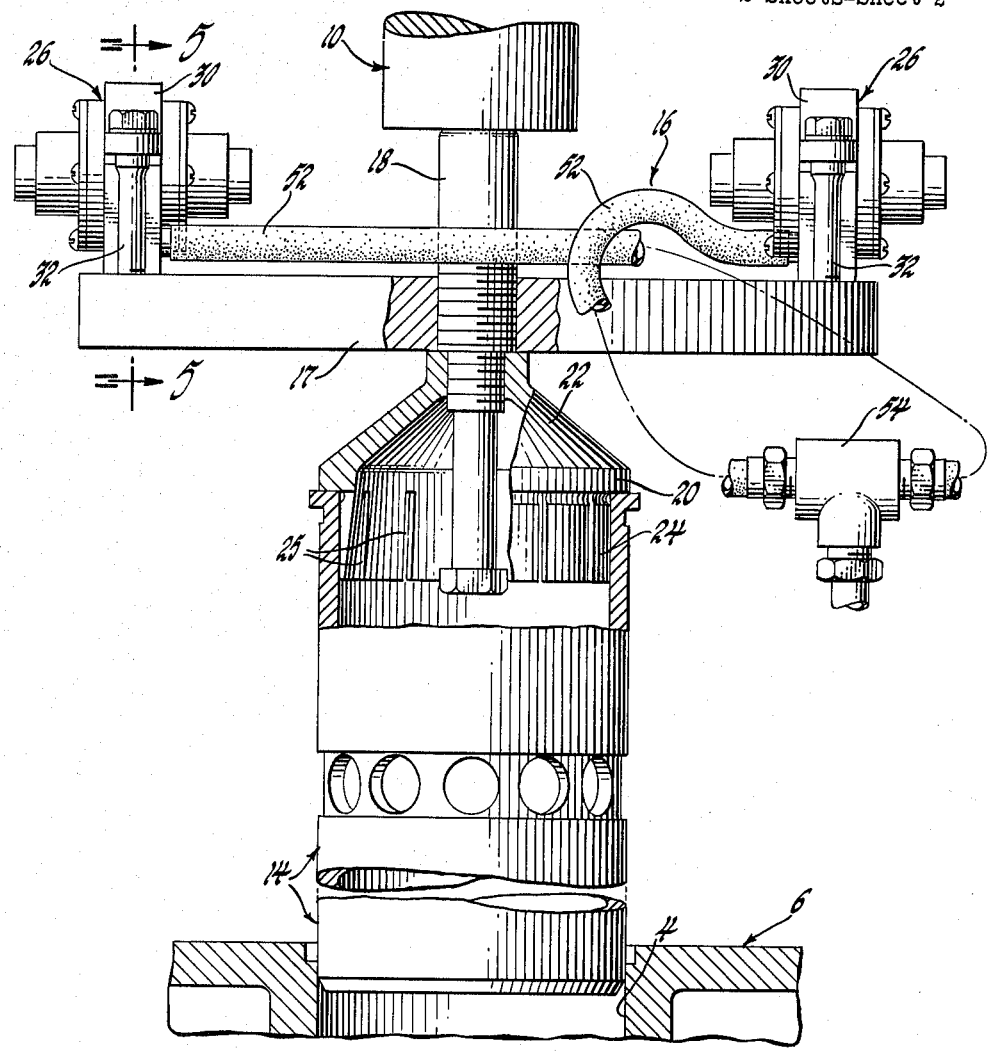
FIGURE 4 is a fragmentary enlarged view of the apparatus of FIGURE 1.

As shown in FIGS. 1 and 4, the liner 14 is in a position which permits it to be inserted into the bore 4 by a combination of an axial force produced by the ram 10 and the vibratory energy supplyed by an apparatus generally indicated by the numeral 16.

As best seen in FIGS. 2-5, the apparatus 16 comprises a disc-shaped flexural member 17 that is threadedly secured to a post 18, which in turn rigidly carries a seating member 20. The seating member has an upper conical-shaped portion 22 that is integral with a reduced diameter skirt portion 24. Vertical slits 25 are circumferentially formed about the skirt to allow a limited amount of flexing thereof so that the skirt may be pressed into an opening in a liner having a smaller diameter than that of the skirt. Thus, upon insertion of the skirt into the liner opening, the skirt portions between the slits tend to flex inwardly under tension so as to retain the liner.

Figure 2:
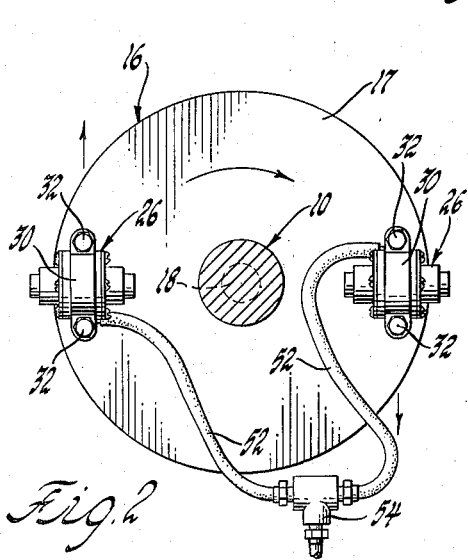
Figure 5:
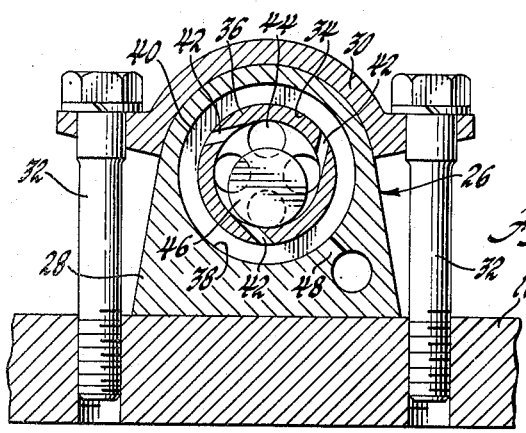
FIGURE 5 is a view taken on line 5—5 of FIGURE 4.

A pair of vibrators 26 are mounted on the flexural member 17 adjacent the periphery thereof and at points diametrically opposite to each other, as seen in FIG. 2. Each of the vibrators are identical in structure and for this reason reference will be made to one only, it being understood that the other has identical and corresponding parts. As viewed in FIG. 5, the vibrator 26 has a housing 28 that is fixedly held to the flexural member by a clamping arrangement including a yoke 30 and a pair of bolts 32. The housing includes a circular bore 34 formed on a transverse axis that has a sleeve 36 press-fitted therein. The sleeve 36 extends laterally outwardly from the bore 34 with a portion thereof being disposed in a counterbore 38 that together with the sleeve 36 serves to define an air entrance chamber 40. A plurality of tangentially directed passages 42 are formed in the laterally extending portion of the sleeve 36 so as to receive air from the annular chamber 40 and permit it to pass as a thin stream into the working chamber 44. A cylindrically-shaped roller 46 is freely disposed within the working chamber 44 and rests, as shown in FIG. 5, on the lower inner surface of the sleeve 36 when the vibrator is not operating. The annular air chamber 40 connects with a radial passage 48 which in turn receives pressurized air from a source 50 via a line 52 and under the control of a regulator valve 54. At this point it should be understood that when pressurized air is supplied to the vibrators, this air is directed to the working chamber 44 through the passage 48, annular chamber 40, and the several air passages 42. Inasmuch as the passages 42 are arranged in a tangential fashion about the working chamber, the air streams formed by the passages enter chamber 44 at various points and cause the roller 46 to be driven in an orbiting manner. Thus, as the roller orbits about the working chamber and makes contact with the inner surface of the sleeve 36, it exerts a radial force thereagainst and in effect produces a rotating force vector which acts in a vertical plane. It should be noted that the vibrator seen in FIG. 5 has the passages 42 inclined in a manner so that the roller is driven in a clockwise direction. Although not shown, the other vibrator has the passages 42 thereof inclined in an opposite direction so that when viewed as the vibrator of FIG. 5, the roller moves in a counterclockwise direction. The reason for this counter-rotating arrangement of the vibrators will be more fully understood from the description of the operation of the invention which follows below.

Assuming it is desired to press fit the liner of FIGS. 1 and 4 into the bore 4, the engine block is positioned below the air-operated ram and the liner is positioned with the undercut lead end thereof in contact with the upper end of the bore and in vertical alignment therewith. The vibration producing apparatus 16 is then placed on the liner with the skirt 24 being pressed into the liner. The air-operated ram then is extended downwardly so as to contact the upper end of post 18 and apply a predetermined preload to the vibration system, which in turn applies this unidirectional force to the liner. Valve 54 is then opened so as to supply pressurized air from the source 50 to the vibrators 26 causing each of the rollers 46 to orbit in opposite directions and set up high frequency vibrations in the flexural member 17. The rotating force vector created by each of the vibrators causes a complex vibrational mode which is the net effect of three motions; one being of the flexural free-free beam type, another is a flexural twist of the plate, while the other is a torsional twist. Each of these motions has a strong influence on inserting the liner.

Figure 3:
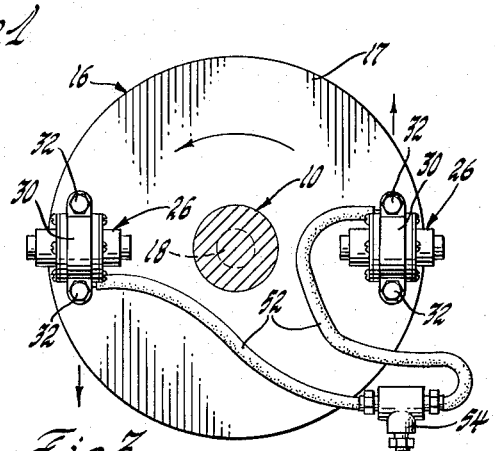

While the vibrators are operating, the rollers move in directions opposite to each other, hence in certain positions of the rollers, namely when the force is being applied in a direction parallel to the surface of the fluexural member, the latter experiences a twisting in both flexure and torsion. Thus, as shown in FIGURES 2 and 3, the vibrators will create a force couple which will alternately act in a clockwise and counterclockwise direction. This couple, combined with the vertical forces created by the ram 10 and the free-free beam movement of the flexural member, is transmitted to the liner and causes the latter to be readily inserted within the bore with a minimum of force being required from the ram. For example, in one test where the interference fit between the liner and the accommodating bore was five-thousandths of an inch (0.005″) it was found that without the vibrators operating it took approximately 11,000 pounds of ram force to push the liner into the bore. Moreover, it was found that the liner did not "bottom" completely and some galling was experienced by the bore side walls. With the vibrators operating the galling effect was completely eliminated and a ram force of approximately 1275 pounds was only required to insert the same liner. Moreover, it was found that less time was required for liner insertion when the vibration system was used and that no chattering effect was experienced, as is common in a press-fitting operation.

In the test run referred to above, the flexural disc employed was 10 inches in diameter and weighed approximated 16.7 pounds. The vibrators were spaced 8.5 inches from centers and were rated at 750 pounds at one kilocycle. The liner had an outer diameter of 3.7495 inches, and a length of 7.0 inches, and weighed approximately 2.94 pounds.

In rating the vibrators used with the present invention, the force generated by the vibrators is in accordance with the well known relationship $F=ma$, where F is force, $m$ is mass, and $a$ is acceleration. Thus, the mass of the rotor times the acceleration of the center of gravity of the rotor mass produces a usable rotating force. Moreover, the vibrators employed are made in accordance with the principles set down in the patent to Svenson, 2,194,410. That is, the diameter of the roller is more than one-half the diameter of the working chamber so for each complete revolution of the roller about its axis, a number of force impulses greater than one is generated against the vibrator housing. Reference is made to the Svenson patent for a complete understanding of this principle.

The operating frequency of the vibrators, of course, will vary with the size and shape of the flexural member, which in turn will be determined by the size, weight, and type of interference fit of the members to be press-fitted. In any event, it is important that the vibrators be of a type or be mounted in such a manner that the flexural member is subjected to a torsional mode. Moreover, from tests conducted with this invention, it has been found that for optimum results, the vibrators should be operated at a frequency not less than 100 cycles per second, and at the resonant frequency of the flexural member.

Various changes and modifications can be made in the above-described apparatus without departing from the spirit of the invention. It should be understood that such changes and modifications are contemplated by the inventor and he does not wish to be limited except by the scope of the appended claims.

What is claimed is:

1. An apparatus for press-fitting a tubular liner into a cylindrical opening in a base member, comprising a seating member contacting the upper end of the liner and having a portion insertable into one end of the liner while the other end thereof is positioned in contact and in alignment with the cylnder opening, a flexural member connected to the seating member and lying in a plane substantially normal to the direction of insertion, a pair of high-frequency vibrators connected to the flexural member at the antinodal points thereof and adapted to vibrate freely, means for driving the vibrators at the resonant frequency of the flexural member so as to provide high frequency forces acting in planes parallel to the longitudinal axis of the liner, and means contacting the flexural member directly for applying a coaxial force to the seating member while the vibrators are operating so as to cause the liner to move into the opening.

2. An apparatus for press-fitting a liner into a cylindrical opening in a base member, comprising a seating member contacting the upper end of the liner and having a reduced cylindrical portion which is insertable into one end of the liner while the other end of the latter is positioned in the opening, a flexural member connected to the seating member, a pair of vibrators mounted on the flexural member and adapted to vibrate freely, means for driving the vibrators so as to provide high-frequency forces in planes offset from and parallel to the longitudinal axis of the liner, and means contacting the flexural member directly for applying a coaxial force to the seating member while the vibrators are operating so as to cause the liner to move into the opening.

3. An apparatus for pressing a liner into a cylindrical opening in a base member, comprising a seating member contacting the upper end of the liner and having a reduced cylindrical portion which is insertable into one end of the liner while the other end of the latter is positioned in the opening, a disc-shaped member connected at its center to the seating member, a pair of high frequency vibrators mounted on the disc-shaped member, each of said vibrators being located adjacent the periphery of the disc-shaped member at points diametrically opposite to each other and adapted to vibrate freely, means for driving the vibrators so as to provide high-frequency forces in planes offset from and parallel to the longitudinal axis of the liner, and means contacting the disc-shaped member directly for applying a coaxial force to the seating member while the vibrators are operating so as to cause the liner to move into the opening.

4. An apparatus for press-fitting a cylindrical member into a cylindrical opening in a base member, comprising a seating member for retaining the upper end of the cylindrical member while the other end of the latter is positioned in the opening, a disc-shaped member connected at its center to the seating member, a pair of air-driven high frequency vibrators mounted on the disc-shaped member, each of said vibrators being located adjacent the periphery of the disc-shaped member at points diametrically opposite to each other, a roller disposed in each vibrator, a source of compressed air for driving each roller in an orbital path and in directions opposite to each other, the orbital axes of said vibrators lying in the same plane and radially disposed relative to the center of the disc-shaped member so as to provide high-frequency forces in a direction offset from and perpendicular to the longitudinal axis of the cylindrical member, and means contacting the disc-shaped member directly for applying a coaxial force to the seating member while the vibrators are operating so as to cause the cylindrical member to move into the opening.

5. An apparatus for pressing a liner into a cylindrical opening in a base member, comprising a seating member contacting the upper end of the liner and having a portion which is insertable into one end of the liner while the other end of the latter is positioned in the opening, a disc-shaped member connected at its center to the seating member, a pair of air-driven high frequency vibrators mounted on the disc-shaped member, each of said vibrators being located adjacent the periphery of the disc-shaped member at points diametrically opposite to each other, a roller disposed in each vibrator, a source of compressed air for driving each roller in an orbital path and in directions opposite to each other, the orbital axes of said vibrators lying in the same plane and radially disposed relative to the center of the disc-shaped member so as to provide high-frequency forces in a direction perpendicular to the longitudinal axis of the liner to cause torsional twisting of the latter, and means contacting the disc-shaped member directly for applying a coaxial force to the seating member while the vibrators are operating so as to cause the liner to move into the opening.

6. An apparatus for pressing a tubular liner into a cylindrical opening in a base member, comprising a seating member contacting the upper end of the liner and having a reduced cylindrical portion which is insertable into one end of the liner while the other end of the latter is positioned in the opening, a disc-shaped member connected at its center to the seating member, a pair of air-driven high frequency vibrators mounted on the disc-shaped member, each of said vibrators being located adjacent the periphery of the disc-shaped member at points diametrically opposite to each other, a roller disposed in each vibrator, a source of compressed air for driving each roller in an orbital path and in directions opposite to each other, the orbital axes of said vibrators lying in the same plane and radially disposed relative to the center of the disc-shaped member so as to provide high-frequency forces in a direction offset from and perpendicular to the longitudinal axis of the liner, and means contacting the disc-shaped member directly for applying a coaxial force to the seating member while the vibrators are operating so as to cause the liner to move into the opening.

References Cited by the Examiner

UNITED STATES PATENTS

| | | |
|---|---|---|
| 2,420,793 | 5/1947 | O'Connor. |
| 2,500,340 | 3/1950 | Boulton _____ 29—525 XR |
| 2,563,479 | 8/1951 | Miles _____ 1—49.9 |
| 3,016,604 | 1/1962 | Castelvecchi _____ 29—255 |
| 3,049,358 | 8/1962 | Polos _____ 1—49.9 XR |
| 3,142,901 | 8/1964 | Bodine _____ 29—525 |

OTHER REFERENCES

"Vibrolator," Martin Engineering Co., May 1958.

WHITMORE A. WILTZ, *Primary Examiner.*